W. H. WILSON.
SIX WHEELED CAR TRUCK.
APPLICATION FILED DEC. 18, 1914.
1,240,638.
Patented Sept. 18, 1917.
6 SHEETS—SHEET 1.
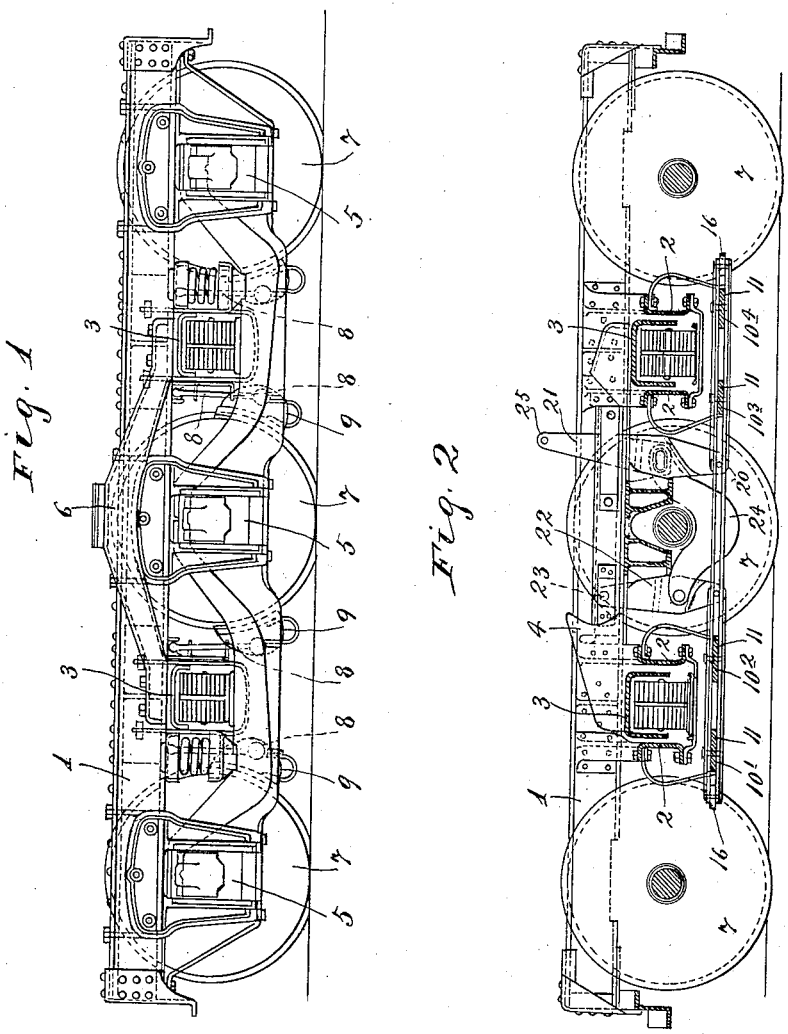
Witnesses
A. H. Opsahl
E. C. Skinkle
INVENTOR
William H. Wilson.
BY HIS ATTORNEYS
Williamson Merchant

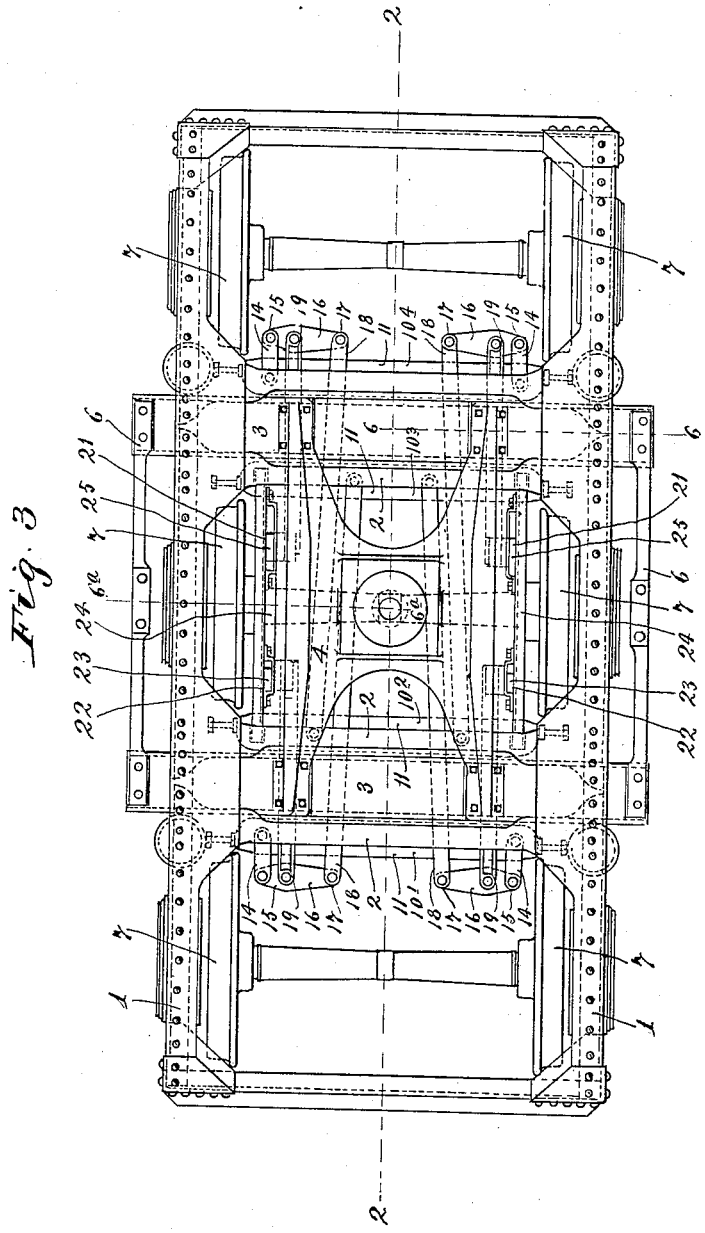

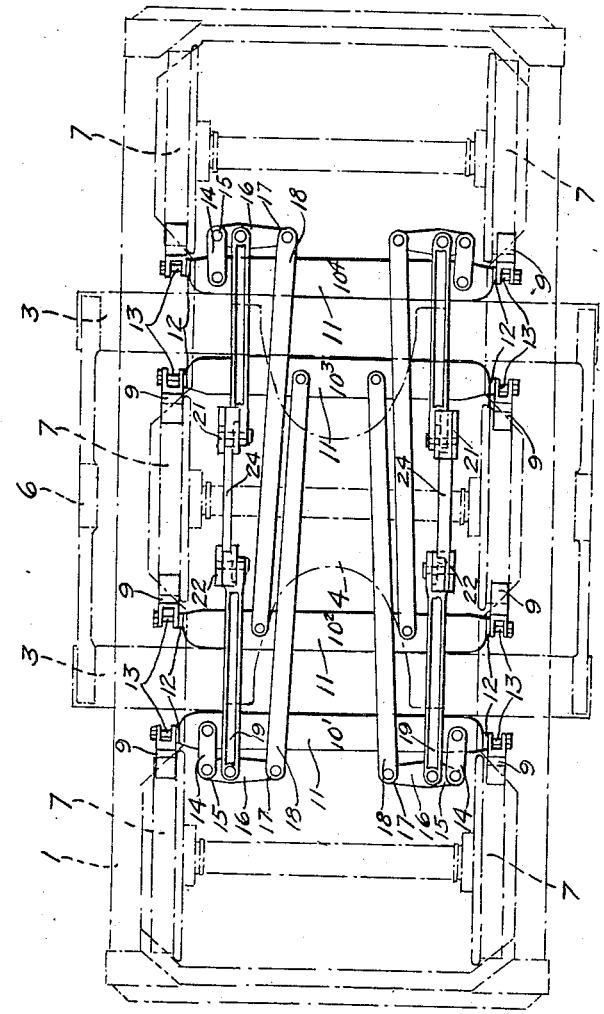

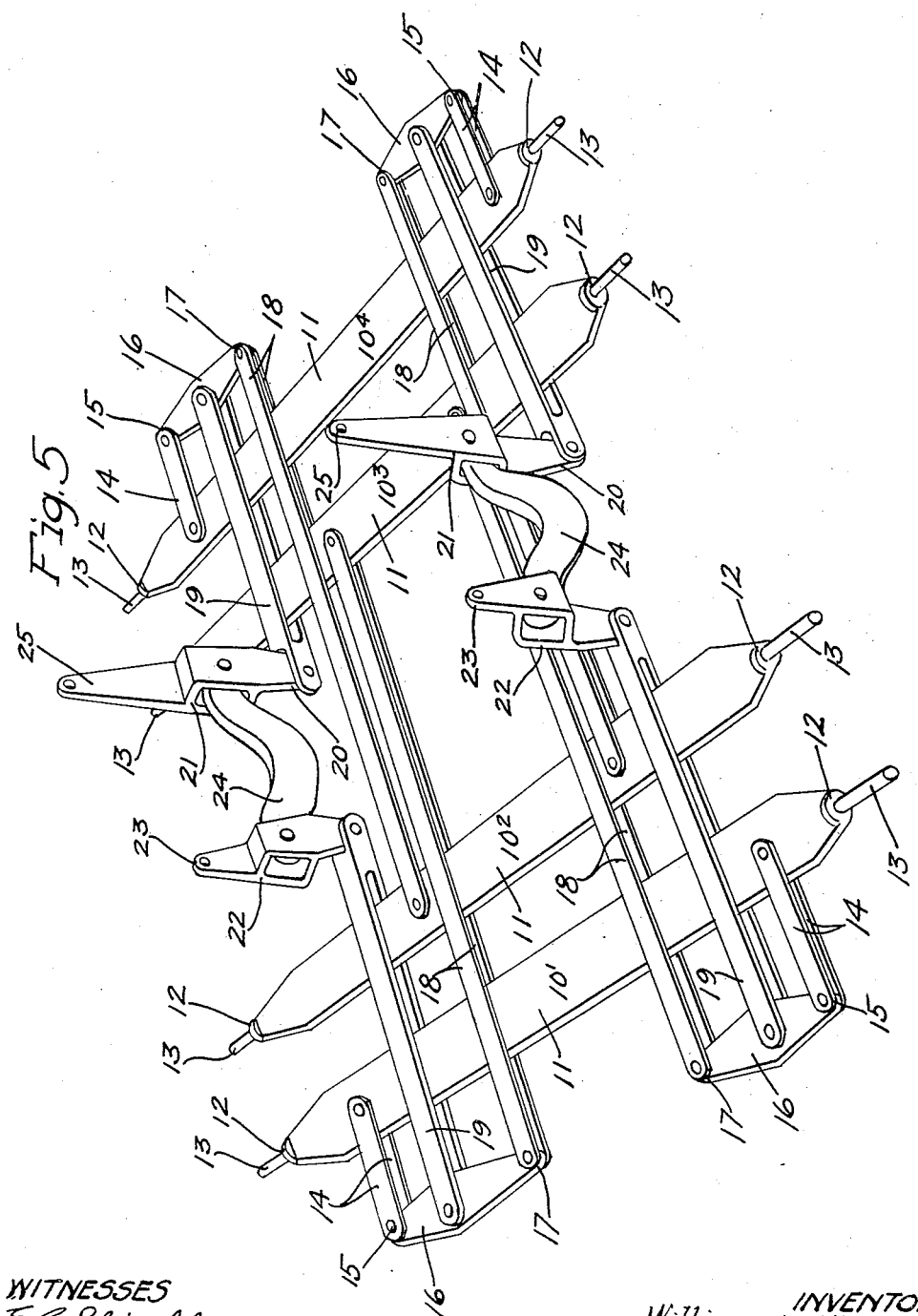

W. H. WILSON.
SIX WHEELED CAR TRUCK.
APPLICATION FILED DEC. 18, 1914.
1,240,638.
Patented Sept. 18, 1917.
6 SHEETS—SHEET 5.
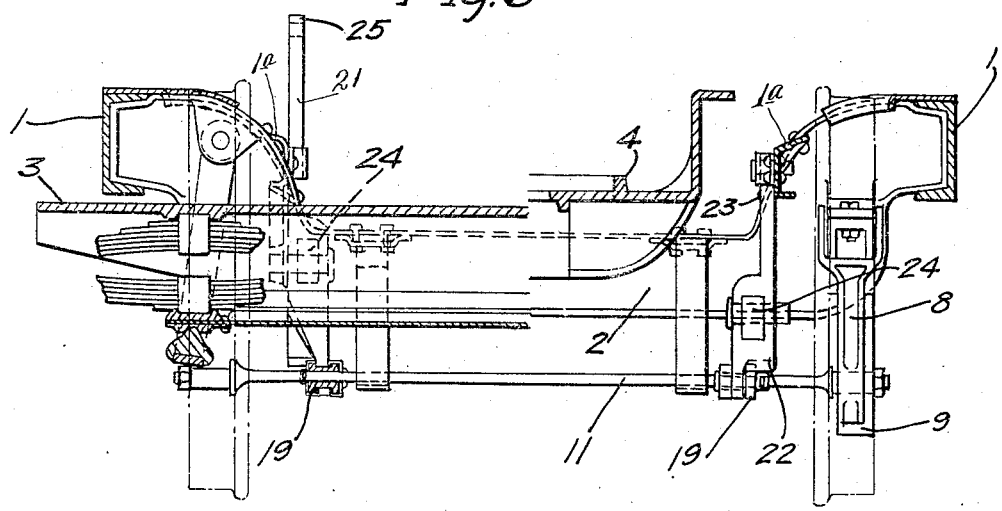
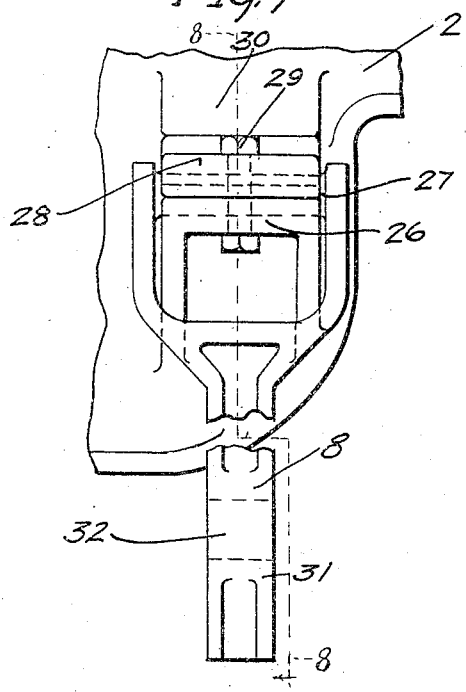
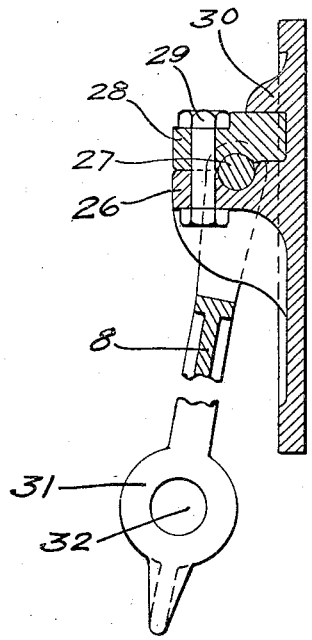
WITNESSES
E. C. Skinkle
A. H. Opsahl
INVENTOR
William H. Wilson
BY HIS ATTORNEYS
Williamson & Merchant

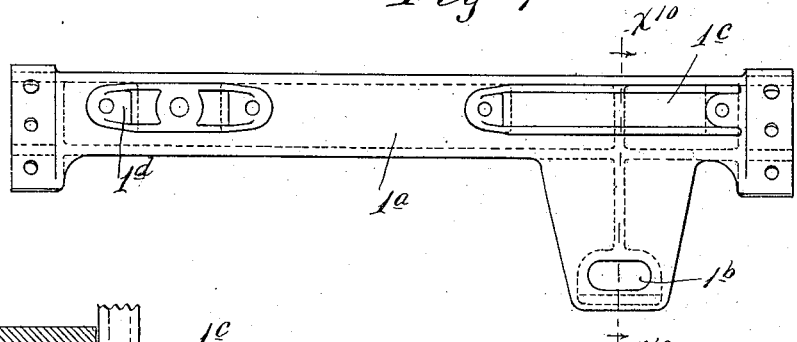
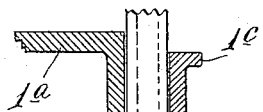
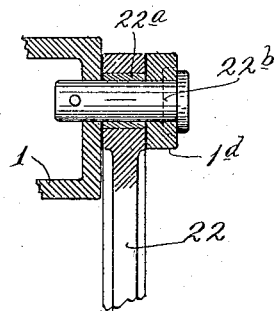
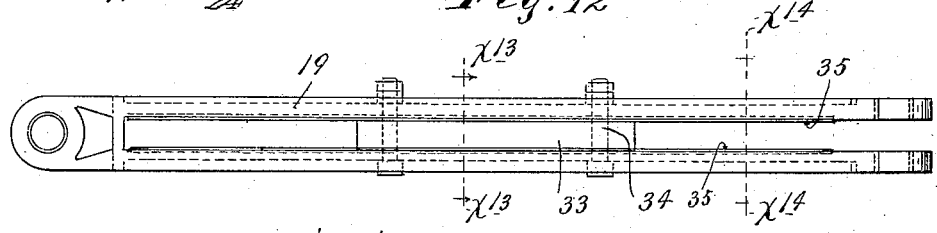
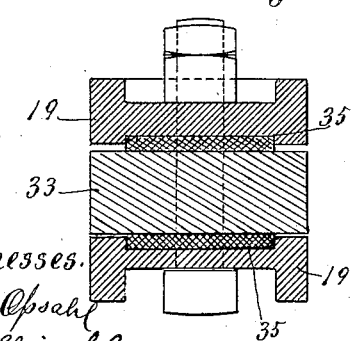
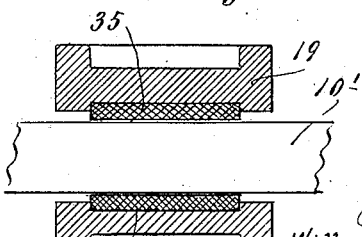

UNITED STATES PATENT OFFICE.

WILLIAM H. WILSON, OF ST. PAUL, MINNESOTA.

SIX-WHEELED CAR-TRUCK.

1,240,638. Specification of Letters Patent. Patented Sept. 18, 1917.

Original application filed November 10, 1913, Serial No. 800,063. Divided and this application filed December 18, 1914. Serial No. 877,961.

*To all whom it may concern:*

Be it known that I, WILLIAM H. WILSON, a citizen of the United States, residing at St. Paul, in the county of Ramsey and State of Minnesota, have invented certain new and useful Improvements in Six-Wheeled Car-Trucks; and I do hereby declare the following to be a full, clear, and exact description of the invention, such as will enable others skilled in the art to which it appertains to make and use the same.

My invention relates to brakes for railway cars, and has for its main object to provide an improved brake mechanism adapted more especially for heavy cars which require the use of six-wheeled trucks.

The present application is a continuation of my application, Serial No. 800,063, filed November 10, 1913.

An object of my invention is to provide a brake rigging for a six-wheeled truck, such truck having brake beams and shoes applied to both sides of the center pair of wheels, and to the inside only of each of the two outer pairs of wheels.

Another object of my invention is to construct and apply the brake rigging in such manner as to, as far as possible, equalize throughout the truck all strains due to braking, and also to counteract the tendency of the truck to tilt, due to the momentum of the car, when the brakes are applied.

A further object of my invention is to provide an arrangement of brake shoes and brake rigging, in which the tendency of the truck frame to tilt, with the application of outside hung brake gear, will be avoided; for it will be observed that with the inside hung brake on the outer wheels, and the double brake on the center wheels, the forces tending to tilt the truck frame, due to the dragging movement of the brake shoes and beams in the direction of rotation of the wheels, act mainly in the opposite direction to the tilting effect caused by the momentum of the car when the wheels are retarded by the application of the brakes.

A further object of my invention is to proportion the various members of the brake rigging in such manner that the brake shoes on each pair of outside wheels will be set with a force somewhat exceeding the force with which the brake shoes are set on the inside pair of wheels, the object being to avoid, as far as possible, the skidding and flattening of the middle pair of wheels, which pair is the most difficult to remove and replace, when replacement becomes necessary because of flat spots being worn in the treads of the wheels.

To attain these various objects, I have provided a new and useful arrangement of what may be called an independent brake system for each side of the truck. Each of the independent systems is preferably provided with three equalizers and the necessary rods and levers to connect them with the brake beams, which are common to both sides of the truck, and, in turn, are connected to the brake motor.

I also provide long brake-hangers to obtain the smallest practicable variations in the angles of the hangers, changes in which angles are unavoidable as a consequence of wear of brake shoes, wheels, etc.

I further employ an improved method of attaching the brake-hangers to the truck frame which is adapted to resist both upward and downward strains on the brake hanger due to setting of the brakes, it being understood that the strain on any particular brake hanger will be downward when the truck is running in one direction, and upward when running in the opposite direction.

In the accompanying drawings, wherein like characters indicate like parts,

Figure 1 is a side elevation of a six-wheeled truck to which my improved brake rigging is applied;

Fig. 2 is a longitudinal section of the same, taken on line 2—2 of Fig. 3;

Fig. 3 is a plan view of the truck;

Fig. 4 is a similar view, the truck frame being shown in dotted lines and the brake rigging in full lines;

Fig. 5 is a perspective of the brake rigging only, no portion of the truck framing being shown;

Fig. 6 is a cross section of the truck, the left hand half being taken on the line 6—6 on Fig. 3, and the right hand half on line 6ª—6ª of Fig. 3;

Fig. 7 is a detail view in side elevation showing the method of connecting one of the brake hangers to the truck frame;

Fig. 8 is a vertical section taken on the line 8—8 of Fig. 7;

Fig. 9 is a side elevation showing one of the detachable sections of one of the side frames;

Fig. 10 is a vertical section taken on the line $x^{10}$—$x^{10}$ on Fig. 9 but showing also one of the floating levers connected thereto;

Fig. 11 shows a pivotal connection between one of the dead levers and side frame;

Fig. 12 is a side elevation showing one of the brake links on a larger scale than in the other views;

Fig. 13 is a section taken on the line $x^{13}$—$x^{13}$ on Fig. 12; and

Fig. 14 is a section taken on the line $x^{14}$—$x^{14}$ on Fig. 12.

Referring now in detail to the drawings, 1 designates the side beams; 2, the transverse beams or braces; 3, the bolster; 4, the bolster bridge; 5, the journal boxes; 6, the side bearing bridges; and 7, the wheels, all of which may be constructed and assembled in any suitable, approved and well known manner.

8, indicates the brake hangers, the upper ends of which are preferably secured to the truck frame in the manner hereinafter described. The brake heads 9, to which the brake shoes are secured, are pivotally connected with the lower ends of the brake hangers 8.

The brake beams $10^1$, $10^2$, $10^3$ and $10^4$ are of an unusual form, having a central rectangular portion 11, shoulder portions 12 and cylindrical end portions 13, the shoulders 12 abutting the brake heads 9, and the cylindrical end portions 13 passing through perforations in the brake heads 9 and in the lower ends of the brake hangers 8, thus forming a hinged or pivotal connection between the brake heads, hangers and brake beams.

To the two outer brake beams $10^1$ and $10^4$, short links 14 are connected by the usual pin means, the other ends of the links 14 being pin connected to one end 15 of a lever member 16, the opposite end 17 of lever 16 being connected to long links 18, which extend past the brake beams $10^3$ and $10^4$ at one end of the truck, and past brake beams $10^1$ and $10^2$ at the other end, and are connected to the brake beams $10^2$ and $10^3$, respectively. To the levers 16 at one end of the truck, at points intermediate their ends, and nearest to their ends 15, link members 19 are connected, which extend and are connected to the lower ends 20 of the live or floating levers 21 that are intermediately connected to the dead levers 22. As best shown in Figs. 9 and 10, these levers 21 have bifurcated central portions, preferably provided with fiber bushings $21^a$ that are journaled on a pivot pin $21^b$ that is held against endwise movements but free for limited traveling movements in elongated slots $1^b$ of the frame sections $1^a$. Also, the said frame sections are shown as provided with offset guide straps $1^c$, that embrace the upwardly extended ends of the said levers 21. Also, as shown in Fig. 10, the ends of the links 24 that are pivoted to the intermediate ends of the levers 21, are provided with fiber bushings $19^a$ that directly engage the traveling pivot pins $21^b$. The said bushings $19^a$ and $21^a$ prevent noise, due to vibration of the links 24 and levers 21. At one end of the truck the link members 19 are connected to the adjacent lever 16 and to the levers 21 while at the other end of the truck the link members 19 are connected to the adjacent levers 16 and to the dead levers 22, the latter being suspended by their upper ends 23 from the side frame. As best shown in Fig. 11, the upper ends of the dead levers 22 are provided with fiber bushings $22^a$ that directly engage a pivot pin $22^b$ that is extended through an adjacent portion of the side frame 1 and through an offset strap $1^d$ on the latter. The levers 21, and the dead levers 22 are at each side of the truck, connected to each other by the members 24, which are shown in the drawings as being curved to avoid interference with the axles of the truck. The upper ends 25 of the levers 21 extend above the truck frame and may be operated in any approved manner, but preferably through the medium of an equalizing lever, to the brake rod which is not shown in the drawings.

It will be evident that the difference in force with which the brake shoes are set on the center pair of wheels, as compared with that on each of the two outer pairs of wheels, as above referred to, is brought about by the difference in the lengths of the two portions of the lever 16, to which the link members 14, 18 and 19 are attached, the distance between the points of attachment of links 18 and 19, to lever 16, being greater than the distance between the points of attachment of links 14 and 19 to levers 16.

The link members 14, 18 and 19 are shown in the drawings as being of the duplex type, in order to avoid interference with the brake beams at points where they pass each other, but it will be obvious to those skilled that these may be made of any suitable form.

The brake hangers 8, hereinbefore referred to, and shown in detail in Figs. 7 and 8 of the drawings, are made long and heavy and preferably of malleable iron or steel castings, and have bifurcated upper ends which, preferably, embrace the brake hanger brackets 26, which are cast integral with the transverse beams 2, of the truck frame. The said bifurcated upper ends of the brake hangers are formed with journal pins 27, which may be formed integral therewith, and rest in suitable bearings, formed in the hanger brackets 26. Retaining clips 28, engaging the upper side of the journal pins 27, are secured to the hanger brackets 26 by bolts 29 or other suitable means, and are further retained in place by the overlapping flanges 30 on the said hanger brackets, this arrangement forming a construction well adapted to resist upward and downward strains produced by setting of the brakes when the truck is running in either direction. The lower ends 31 of the brake hangers 8, are adapted to extend between the flanges formed on the back of the brake heads, and are provided with perforations 32, through which, and through corresponding perforations in the flanges of the brake heads, the cylindrical end portions of the brake beams pass, thus forming the pivotal connection between the hanger, brake head and brake beam hereinbefore referred to.

All of the above noted links 14, 18 and 19, are preferably bifurcated or made up of upper and lower straps. Fig. 12 shows in detail the preferred construction of one of the links 19, and this construction illustrates in a general way, substantially the construction that is preferred, also, in the links 14 and 17. By reference to the said Fig. 12 and the Figs. 13 and 14, it will be noted that a spacing block 33 is interposed between the intermediate portions of the upper and lower straps of the said link 19 and secured thereto by bolts 34. To prevent noise due to vibration of these links, in respect to the brake beams which are passed therethrough, strips 35 of fiber are set into the under face of the upper strap of the said link, and into the upper face of the lower strap or link, so that it bears directly against the said brake beams.

What I claim is:

1. In a six-wheel truck, brake mechanism adapted to independently set the brakes on each side of the truck, and to set the brake shoes on the outer wheels with greater force than on the middle wheels.

2. In a six-wheel truck, brake shoes applied only to the inner peripheral faces of the outside wheels, and to both faces of the middle wheels, in combination with brake mechanism adapted to independently set the brakes on the wheels on each side of the truck.

3. In a six-wheel truck, brake shoes applied to the inner peripheral faces of the outside wheels, and to opposite faces of the middle wheels, in combination with brake mechanism adapted to independently set the brakes on each side of the truck, and to set the brake shoes on the outer wheels with greater force than on the middle wheels.

4. In a six-wheel truck, brake shoes applied to the inner peripheral faces of the outside wheels, and to opposite faces of the middle wheels, and brake beams connecting the brake shoes on the same side of each pair of wheels, in combination with a live lever and a dead lever, a connection therebetween, a pair of equalizing levers, connections from the live lever to an intermediate portion of one equalizing lever, and from the dead lever to an intermediate portion of the other equalizing lever, and connections from one end of an equalizing lever to one brake beam, and from the other end of said equalizing lever to another brake beam.

5. In a six-wheel truck, brake shoes applied to the inner peripheral faces of the outside wheels, and to opposite faces of the middle wheels, and brake beams connecting the brake shoes on the same side of each pair of wheels, in combination with a live lever and a dead lever, a connection therebetween, a pair of equalizing levers, connections from the live lever to an intermediate portion of one equalizing lever, and from the dead lever to an intermediate portion of the other equalizing lever, and connections from one end of an equalizing lever to the brake beam engaging the brake shoes on the outside wheels, and from the other end of said equalizing lever to one of the brake beams engaging the brake shoes on the middle pair of wheels.

6. In a six-wheel truck, brake shoes applied to the inner peripheral faces of the outside wheels, and to opposite faces of the middle wheels, and brake beams connecting the brake shoes on the same side of each pair of wheels, in combination with a floating lever and a dead lever, a connection therebetween, a pair of equalizing levers, connections from the floating lever to an intermediate portion of one equalizing lever, and from the dead lever to an intermediate portion of the other equalizing lever, and connections from one end of an equalizing lever to one brake beam, and from the other end of said equalizing lever to another brake beam.

7. In a six-wheel truck, brake shoes applied to the inner peripheral faces of the outside wheels, and to opposite faces of the middle wheels, and brake beams connecting the brake shoes on the same side of each pair of wheels, in combination with a floating lever and a dead lever, a connection therebetween, a pair of equalizing levers, connections from the floating lever to an intermediate portion of one equalizing lever, and from the dead lever to an intermediate portion of the other equalizing lever, and connections from one end of an equalizing lever to the brake beam engaging the brake shoes on the outside wheels, and from the other end of said equalizing lever to one of the brake beams engaging the brake shoes on the middle pair of wheels.

In testimony whereof I affix my signature in presence of two witnesses.

WILLIAM H. WILSON.

Witnesses:
ELMER C. SKINKLE,
R. J. MATTHEWS.

Copies of this patent may be obtained for five cents each, by addressing the "Commissioner of Patents, Washington, D. C."